United States Patent [19]

Weetman et al.

[11] Patent Number: 5,076,760
[45] Date of Patent: Dec. 31, 1991

[54] INJECTION MOLDED, HIGH STRENGTH IMPELLER

[75] Inventors: Ronald J. Weetman, Rochester; Walter C. Webster, Brockport, both of N.Y.

[73] Assignee: General Signal Corporation, Stamford, Conn.

[21] Appl. No.: 608,115

[22] Filed: Nov. 1, 1990

[51] Int. Cl.[5] .................. F04D 29/32; B29C 45/14
[52] U.S. Cl. ....................... 416/204 R; 416/226; 416/229 R; 416/241 A; 264/155; 264/277
[58] Field of Search ........... 416/204 R, 213 A, 223 R, 416/226, 229 R, 241 A, 230; 264/108, 261, 328.12, 155, 277

[56] References Cited

U.S. PATENT DOCUMENTS

| | | | |
|---|---|---|---|
| 1,686,069 | 10/1928 | Bucklen | 416/226 |
| 2,423,700 | 7/1947 | Hardy | 416/229 |
| 2,794,756 | 6/1957 | Leverenz . | |
| 2,996,764 | 8/1961 | Ross et al. . | |
| 3,037,652 | 6/1962 | Wallace . | |
| 3,136,370 | 6/1964 | Carlson | 416/229 |
| 3,256,939 | 6/1966 | Novak | 416/169 C |
| 3,268,643 | 8/1966 | Katzenmeyer . | |
| 3,351,691 | 11/1967 | Wilford . | |
| 3,402,879 | 9/1968 | Schroeter | 416/204 |
| 3,408,944 | 11/1968 | Belonger et al. | 416/241 A |
| 3,445,559 | 5/1969 | Siteman . | |
| 3,510,551 | 5/1970 | McCrea . | |
| 3,594,102 | 7/1971 | Oden | 416/244 R |
| 3,751,181 | 8/1973 | Hayashi | 416/241 A |
| 3,865,509 | 2/1975 | Frazzell et al. | 416/241 A |
| 4,017,961 | 4/1977 | Kochte et al. . | |
| 4,021,524 | 5/1977 | Grimsley . | |
| 4,040,670 | 8/1977 | Williams . | |
| 4,076,788 | 2/1978 | Ditto . | |
| 4,088,729 | 5/1978 | Sherman . | |
| 4,115,506 | 9/1978 | Shima . | |
| 4,430,285 | 2/1984 | Runyan et al. . | |
| 4,689,190 | 8/1987 | Peisker et al. . | |
| 4,722,608 | 2/1988 | Salzman et al. | 416/241 A |
| 4,747,900 | 5/1988 | Angus | 416/241 A |
| 4,826,645 | 5/1989 | Angus | 264/108 |

*Primary Examiner*—Edward K. Look
*Assistant Examiner*—James A. Larson
*Attorney, Agent, or Firm*—Martin Lukacher; Milton E. Kleinman

[57] ABSTRACT

A method of injection molding a thermoplastic material around a two-piece insert having a rotational axis through which a bore passes is disclosed. The insert is formed from two pieces which are axially spaced to define an annular gate through which the injected thermoplastic material passes radially outward. This technique is particularly useful for forming mixing impellers, because it orients fibers contained within the thermoplastic material in a radially outward direction within the impeller's blades to provide increased strength. The insert also allows improved performance for injection molding parts by reducing their cross-sectional thickness to optimal values. The insert also allows machining the bore without harming the injected plastic material.

11 Claims, 3 Drawing Sheets

INJECTION MOLDED, HIGH STRENGTH IMPELLER

FIELD OF THE INVENTION

The present invention relates to a process for injection molding articles with a thermoplastic material around a thermoplastic insert and, more particularly, relates to the production of high strength mixing impellers with a glass fiber containing thermoplastic material.

BACKGROUND OF THE INVENTION

Processes for injection molding articles typically involve injecting a thermoplastic material into a mold with a cavity configured to form such an article. After allowing the thermoplastic material to solidify, the resulting article is removed from the mold. Prior to injection, the thermoplastic material is melted with heat and, after injection, is allowed to cool either by ambient conditions surrounding the mold or by providing the mold with passages through which a coolant circulates.

In molding articles with thermoplastic materials, it is often desirable to place an insert in the mold cavity and then inject thermoplastic material on or around the insert.

U.S. Pat. No. 3,351,691 to Wilford relates to a method of molding rocket nozzles by injecting a thermosetting material into a mold and around an insert member. In this process, material is injected into the mold below the level of the insert and allowed to flow radially outwardly and ultimately either downwardly away from the insert or upwardly around the insert.

In U.S. Pat. No. 4,115,506 to Shima, a ski is produced by injection molding where a thermoplastic resin containing glass fibers is injected into a mold over a ski body insert within the mold.

U.S. Pat. No. 4,021,524 to Grimsley relates to a method of making a collapsible tube with an integral cap by injecting a thermoplastic material into a mold containing the upper portion of a tubular body to which the closure is to be attached.

U.S. Pat. No. 4,430,285 to Runyan et al. forms a rotary plug valve housing in which the plug is positioned within the cavity of a mold, and molten polymeric material is introduced into the cavity around the plug.

U.S. Pat. No. 4,088,729 to Sherman relates to a method of forming the hub for an abrasive disk by placing the disk having a central opening in a mold cavity and then injecting thermoplastic material into the mold to form the centrally-located hub.

Other injection molding processes involving the use of an insert are disclosed in U.S. Pat. No. 4,689,190 to Peisker et al., U.S. Pat. No. 4,076,788 to Ditto, U.S. Pat. No. 4,040,670 to Williams, U.S. Pat. No. 3,268,643 to Katzenmeyer et al., U.S. Pat. No. 3,037,652 to Wallace, U.S. Pat. No. 4,017,961 to Kochte et al., U.S. Pat. No. 3,445,559 to Siteman, and U.S. Pat. No. 2,996,764 to Ross et al.

Although injection molding technology has been utilized to form a wide variety of articles from thermoplastic materials, it has not been utilized to produce mixing impellers due to the requirement that such devices have sufficient strength to overcome the forces applied against the impeller blades by the material being mixed. Instead, such impellers have been produced from metal or by building up layers of plastic material or by compression molding of resin containing comminuted glass fibers. Such techniques of forming mixing impellers, however, tend to be time consuming and expensive.

SUMMARY OF THE INVENTION

The present invention relates generally to a mixing impeller formed by a injection molding around a two-piece insert extending along a rotational axis and having a bore coaxial with the axis. The insert pieces are axially spaced apart from one another to define an annular gate between them. In this process, the insert is placed within the cavity of a mold, and thermoplastic material is injected through the bore and gate and into the cavity of the mold. After the cavity is substantially filled, the thermoplastic material is allowed to solidify within the mold. The resulting solidified impeller is then discharged from the mold. It is especially desirable to the mixing impeller from a thermoplastic material containing glass fibers and also to make the insert from such materials with or without glass fibers. These materials, when utilized to form impellers in accordance with the present invention, flow smoothly through the annular gate which causes the fibers in the thermoplastic material to be oriented radially outwardly in the blades along their length. This fiber orientation strengthens the impeller blades so that they can withstand the stresses encountered when in use.

Utilization of an insert having an axial bore, has the added advantage of permitting the resulting mixing impeller to receive drive shafts of varying diameter by drilling out the bore.

Additionally, the part of the mixing impeller's central core, which is injection molded around the insert, has a reduced cross-sectional area. As a result, this portion of the central core can be easily molded.

DETAILED DESCRIPTION OF THE DRAWINGS

Figure 1:
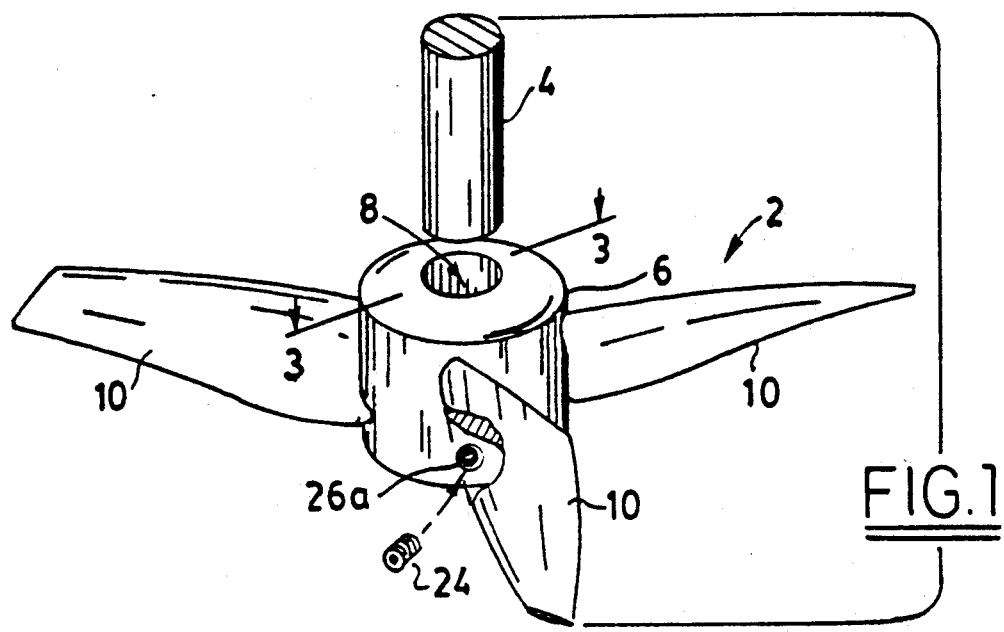
FIG. 1 is an exploded perspective view of a mixing impeller assembly, a drive shaft for that assembly, and screws to connect them.

FIG. 1 is an exploded perspective view of a mixing impeller assembly 2 and a drive shaft 4 for that assembly. Mixing impeller 2 includes a hub 6 through which axial bore 8 passes. Extending radially outwardly from hub 6 are three impeller blades 10 spaced 120° apart. By fitting shaft 4 into bore 8 of mixing impeller 2 and then inserting set screws 24 into threaded inserts 26a, shaft 4 is fixedly attached to impeller 2. As a result, rotation of shaft 4 turns impeller 2. An impeller which is especially suited for manufacture using the process of the present invention is described in copending U.S. patent application Ser. No. 559,126 filed July 26, 1990 by Ronald J.

Weetman and entitled "Mixing Impellers and Impeller Systems for Mixing and Blending Liquids and Liquid Suspensions Having a Wide Range of Viscosities".

Figure 2:
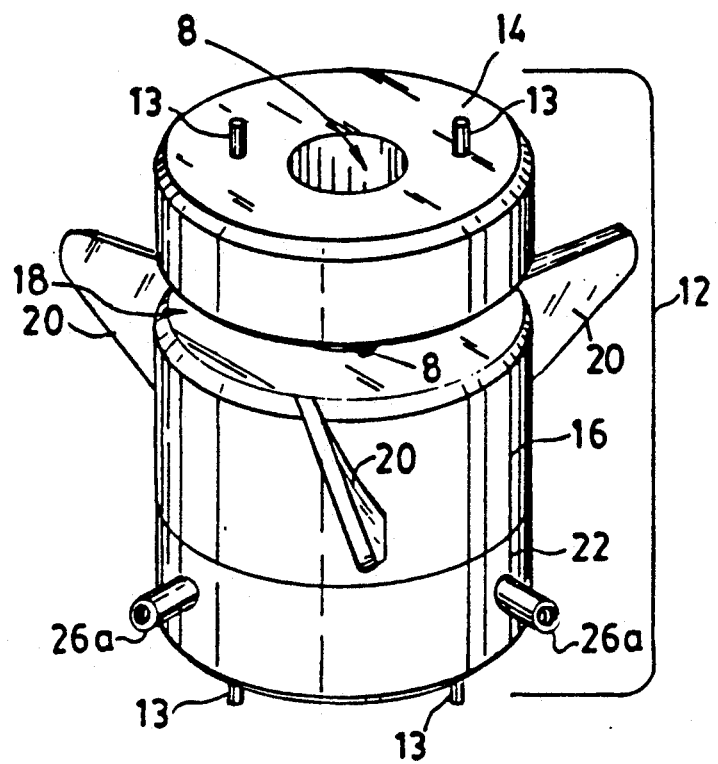
FIG. 2 is a perspective view of an insert for the mixing impeller of the present invention.

FIG. 2 is a perspective view of insert 12 which, as depicted in FIGS. 3-6, is to be positioned within hub 6 of mixing impeller 2. As illustrated in FIG. 2, the bulk of bore 8 is surrounded along its axial extent by first insert part 14 and second insert part 16 of insert 12. First insert part 14 and second insert part 16 are axially spaced to define annular gate 18, which surrounds bore 8. In an injection mold, the axially-spaced relationship of first insert part 14 and second insert part 16 is maintained by pins 13 extending axially outward from first insert part 14 and second insert part 16 to abut the surface of the mold cavity. For insert part 14, there are 2 pins 13, preferably spaced 180° apart, while there are 2 pins 13 extending from insert part 16 which are preferably 120° apart. Metal ring 22 in second insert part 16 is provided to orient metal inserts 26a in radially displaced bores 26 threaded properly with respect to bore 8. These threaded inserts 26a receive set screws 24 before positioning insert 12 in an injection mold.

Figure 3:
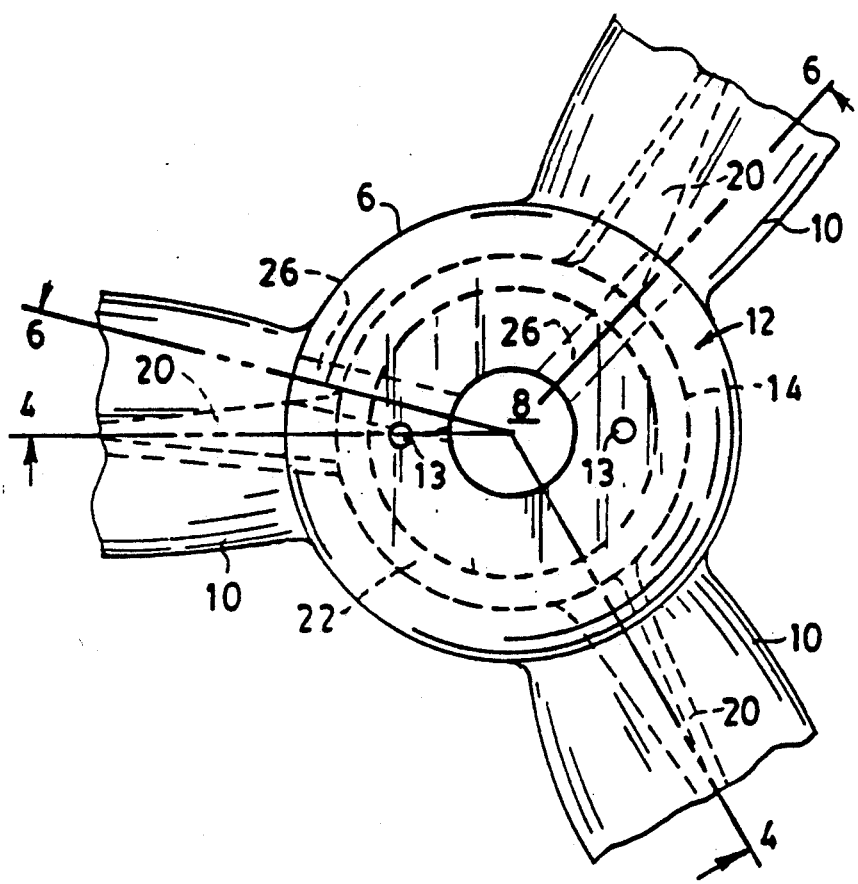
FIG. 3 is a top view of the mixing impeller of FIG. 1 taken along line 3—3.

FIG. 3 is a top view of the impeller of FIG. 1 taken along line 3—3. As illustrated by this drawing, a large part of the cross-sectional area of central core 6 is occupied by insert 12. This reduces the area of hub 6 which is formed from the injection molded thermoplastic material utilized to form blades 10. This allows thin cross-sections to be formed which are required for strong, dimensionally accurate, injection molded parts with substantially no voids. Typically, the maximum desirable thickness of the thermoplastic material (except for the radial extent of blades 10) is less than ¾ inches, preferably less than ⅜ inches.

Figure 4:
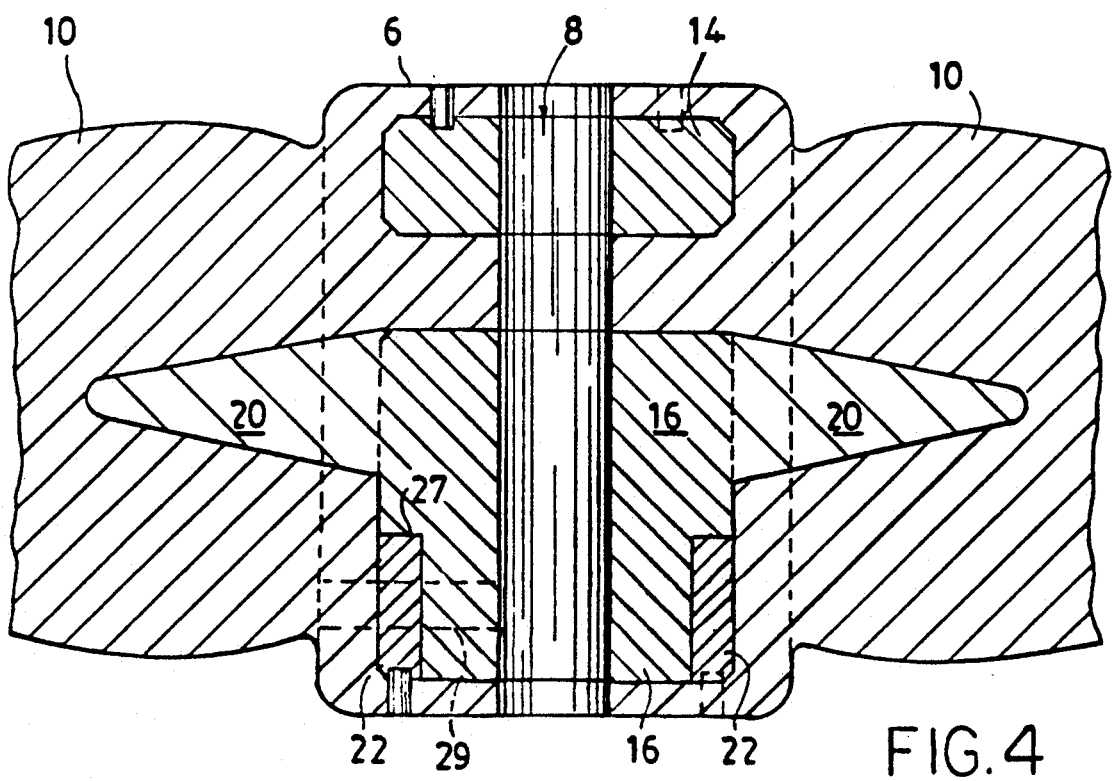
FIG. 4 is a cross-sectional view of the mixing impeller of FIG. 3 taken along line 4—4.

FIG. 4, which is a cross-sectional view of the mixing impeller of FIG. 3 taken along line 4—4, shows that the part of hub 6 surrounding insert 12 is formed from the same thermoplastic material as blades 10. Any of a variety of thermoplastic materials can be used to form insert 12 as well as the surrounding portion of hub 6 and blades 10. These materials include polypropylene, polyetheretherketone, polyetherimide polyketone, polyphenylene sulfide, polyphthallamide, polyvinylidene fluoride, and mixtures thereof. Insert 12 can be formed from the same or different thermoplastic materials as the surrounding portions of hub 6 and blades 10. It is particularly desirable to include glass fibers in such materials to increase impeller strength. The fibers vary in length from 1/32 to ⅛ inches with the mean length of the fibers being 1/16 inches. Other fibers, such as aramid fibers and graphite fibers, may also be used. The thermoplastic material used to form insert 12 contains 0 to 40, preferably 20, weight percent glass fibers, while the thermoplastic material used to form blades 10 and the portion of hub 6 surrounding insert 12 contains 30 to 60, preferably 40, weight percent glass fibers. The insert is preferably formed from the same thermoplastic as the injected material so that insert 12 and the surrounding thermoplastic material forming core 6 fuse together.

Attached to second insert part 16 and extending radially outwardly into each blade 10 is a spar 20 which further increases the strength of the impeller blades. Preferably, spar 20 is made from the same material as insert 12 and may be a part of or attached thereto by a force fit (e.g., a shaft tapped into a hole in the insert (not shown)).

Alternatively to the insert 26a, a metal ring 22 may be force fitted around an undercut area 27 of lower insert part 16. Holes 29 may then be drilled through hub 6. Ring 22 provides a secure connection for the set screws 2. When inserts 26a are used, they are ground flush with the outer periphery of hub 6.

Figure 5:
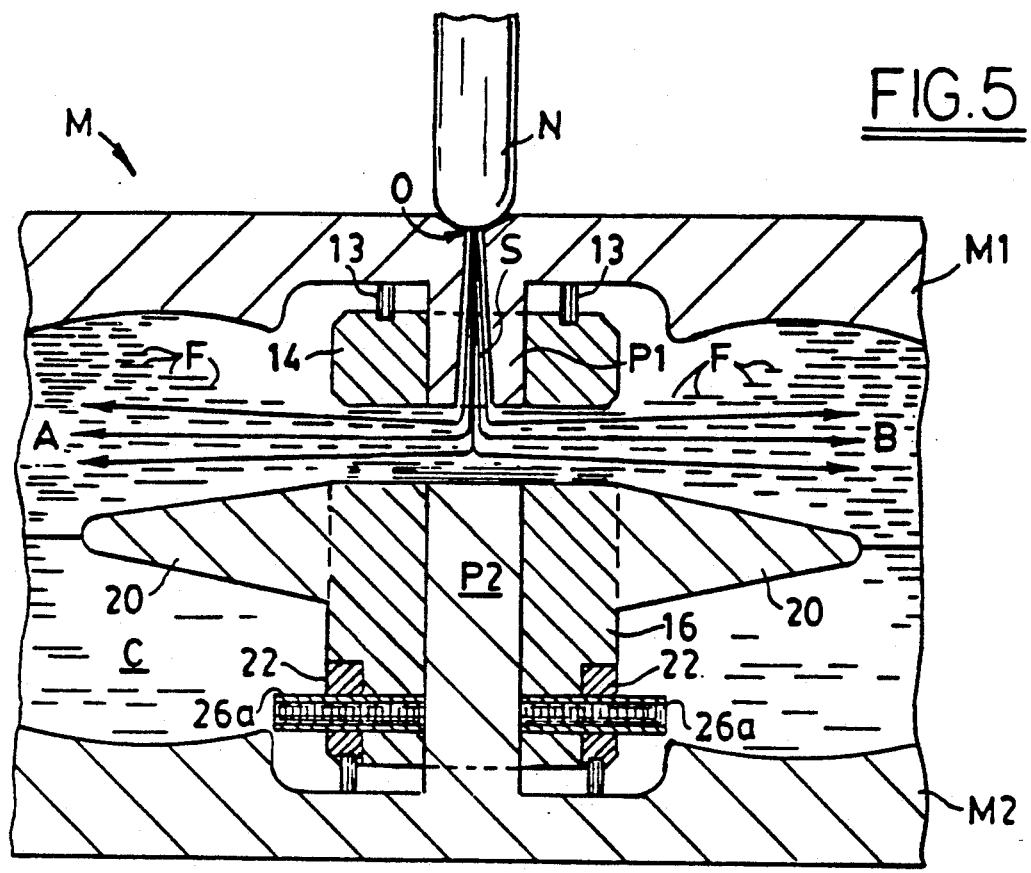
FIG. 5 is a cross-sectional view of a mold in which an impeller in accordance with the present invention is being formed.

FIG. 5 is a cross-sectional view of a mold M in which an impeller in accordance with the present invention is being formed. It should be noted that FIG. 5 is schematic in that spars 20 and inserts 26a are not actually 180° apart. This is apparent from FIGS. 3, 4 and 6. In producing mixing impellers, mold section M1 must be separated from mold section M2, and insert 12 is then placed within cavity C defined by mold M. The thermoplastic material for the remainder of the impeller is then injection molded around the insert. In placing insert 12 within cavity C, mandrel P2 of mold section M2 must be inserted through bore 8 of second insert part 16 and mandrel P1 of mold section M1 must be inserted through bore 8 of first insert part 14. The interfitting relationship of mold sections M1 and M2 (not shown) and their abutment with pins 13 of first insert part 14 and second insert part 16 properly align these parts with respect to one another. Such alignment is aided by providing holes (not shown) in mold sections M1 and M2 to receive the ends of pins 13. Alternatively, the pins may be mounted in mold sections M1 and M2 and be received by holes in first insert parts 14 and ring 22 in second insert part 16. Once insert 12 is positioned with respect to mold part M2, mold part M1 is sealingly attached to mold part M2 to define cavity C between them.

Mold part M1 includes opening O through which thermoplastic material from nozzle N can be injected and molded around insert 12. Material injected through opening O passes within sprue S, through bore 8 of first insert part 14, into annular gate 18, and 360° radially and smoothly outwardly, including along paths A and B. Mandrel P2 extends within bore 8 up to the upper extent of second insert part 16 so that no thermoplastic material enters this portion of the bore, while mandrel P1 occupies bore 8 within first insert part 14 in substantially the same way. As thermoplastic material passes radially outwardly through gate 18, glass fibers F within it are oriented in a radially outward direction. This orientation is facilitated by the beveled surfaces of insert 12 at gate 18 and at the ends of first insert part 14 and second insert part 16. This constitutes a significant advance in the art, because such fiber orientation strengthens the ultimately-formed impeller blades. After cavity C is filled with thermoplastic material, the flow of thermoplastic material from nozzle N is discontinued. The thermoplastic material in mold M is then allowed to cool and solidify in the form of a mixing impeller. Once such solidification is completed, mold parts M1 and M2 of mold M are separated and solidified mixing impeller 2 is removed.

Although FIG. 5 does not show set screws 24 (See FIG. 1) fitted in inserts 26a during molding, it is preferable that such set screws be installed to prevent thermoplastic material from filling inserts 26a. This obviates the need for expensive retractible tooling. It is often desirable that inserts 26a not extend to bore 8 so that if bore 8 is later enlarged to receive a larger shaft, metal inserts 26a need not be machined.

Figure 6:
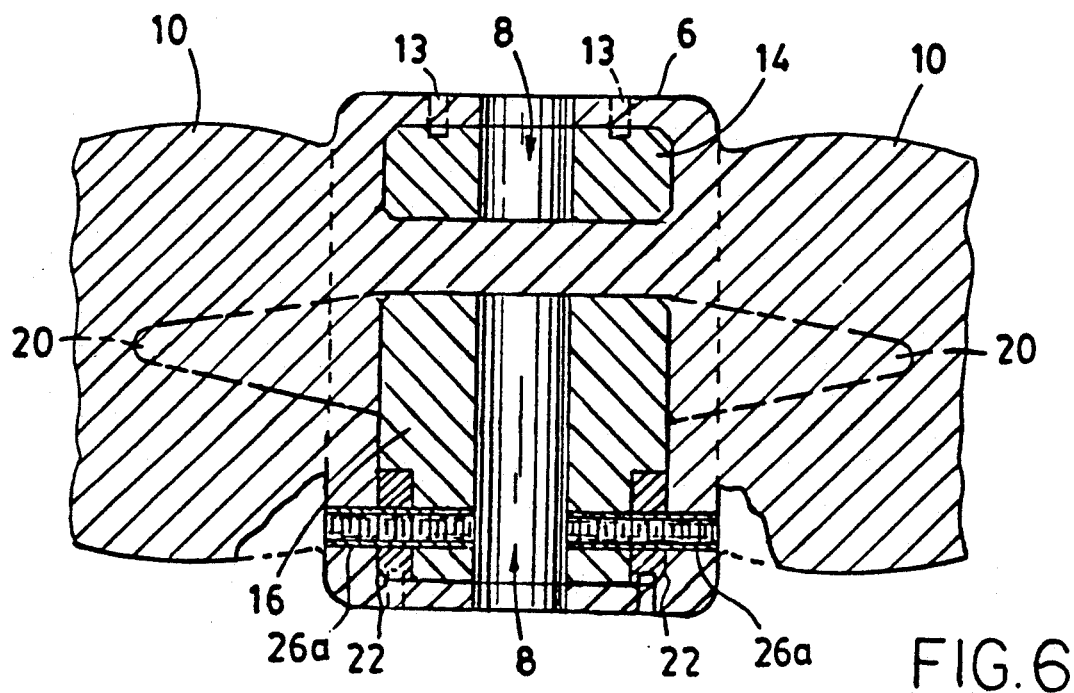
FIG. 6 is a cross-sectional view of the mixing impeller of FIG. 3 taken along line 6—6 and made in accordance with the technique shown in FIG. 5 before the central bore is fully formed.

Typically the mixing impeller is in ready-to-use form immediately after injection molding, except as depicted in FIG. 6, the portion of bore 8 previously surrounded by annular gate 18 and sprue S are filled with thermoplastic material. The axial continuity of bore 8 can, however, be restored by "drilling out" this obstruction. Should bore 8 need additional widening to accommodate a shaft of greater diameter, bore 8 can be "drilled out" longitudinally with a bit of suitable size.

By use of the present injection molding technique, a high strength mixing impeller can be produced rapidly and economically.

Although the invention has been described in detail for the purpose of illustration, it is understood that such detail is solely for that purpose, and variations can be made therein by those skill in the art without departing from the spirit and scope of the invention which is defined by the following claims. For example, annular gate 18 can be replaced by a plurality of very large openings extending radially outward from bore 8. This approximates a 360° opening and achieves the above-discussed radial fiber orientation.

We claim:

1. A mixing impeller comprising:
   a central hub extending along a rotational axis between a first end and a second end and having a bore between the first and second ends which is coaxial with the rotational axis, said hub comprising:
   an insert surrounding and coaxial with the bore, said insert substantially defining the radial periphery of said bore, said insert having opening means extending radially outward from the bore and
   an outer member surrounding and coaxial with the insert, wherein the outer member fills the opening means and is integral with the insert; and
   a plurality of impeller blades extending radially outwardly from the outer member, wherein said plurality of impeller blades and the outer member are formed from a first plastic material containing fibers, while the opening means is filled with the first plastic material and is positioned so that the fibers are oriented radially outwardly within the blades to increase blade strength.

2. A mixing impeller comprising:
   a central hub extending along a rotational axis between a first end and a second end and having a bore between the first and second ends which is coaxial with the rotational axis, said hub comprising:
   an insert surrounding and coaxial with the bore, said insert substantially defining the radial periphery of said bore and having opening means extending radially outward from the bore, said insert comprising:
   a first part adjacent the first end and
   a second part adjacent the second end, wherein the first and second parts are axially spaced to define as the opening means an annular gate between them and around the bore, and
   an outer member surrounding and coaxial with the insert, wherein the outer member fills the opening means and is integral with the insert; and
   a plurality of impeller blades extending radially outwardly from the outer member, wherein the opening means causes said plurality of impeller blades and the outer member, formed from a first plastic material containing fibers, to have the fibers be oriented radially outwardly within the blades to increase blade strength.

3. A mixing impeller according to claim 2, wherein the impeller has three blades spaced 120° apart.

4. A mixing impeller according to claim 2, wherein the insert is made from a second plastic material which is the same or different from the first plastic material, the first and second plastic materials being selected from the group consisting of polypropylene, polyetheretherketone, polytherimide polyketone, polyphenylene sulfide, polyphthallamide, polyvinylidene fluoride, and mixtures thereof.

5. A mixing impeller according to claim 4, wherein the first and second plastic materials contain glass fibers with the first plastic material containing 30 to 60 weight % glass fibers, while the second plastic contains 0 to 40 weight % glass fibers.

6. A mixing impeller according to claim 5, wherein the first plastic material is no more than ¾ inches thick.

7. A mixing impeller according to claim 5 further comprising a plurality of strengthening spars extending radially outward from the insert and into the blades.

8. A mixing impeller according to claim 2 further comprising:
   fastener means on said central hub suitable for attaching said impeller to a drive means.

9. A mixing impeller according to claim 8 further comprising:
   a drive shaft extending into the bore and attached to said central hub with said fastener means.

10. A mixing impeller according to claim 9, wherein said fastener means comprises:
    a plurality of threaded passages extending radially outwardly from the bore to the exterior of said central hub and
    a plurality of screws within said plurality of threaded passages to lockingly attach said impeller to said shaft.

11. A mixing impeller according to claim 8 further comprising:
    a ring in the insert integral with the plurality of threaded passages to fix and orient the passages relative to the insert.

* * * * *